(12) United States Patent
Pesik et al.

(10) Patent No.: US 10,371,812 B2
(45) Date of Patent: Aug. 6, 2019

(54) ULTRA-WIDEBAND RADAR ALTIMETER

(71) Applicant: Rosemount Aerospace Inc., Burnsville, MN (US)

(72) Inventors: Joseph T. Pesik, Eagan, MN (US); Todd Anthony Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 345 days.

(21) Appl. No.: 15/440,796

(22) Filed: Feb. 23, 2017

(65) Prior Publication Data

US 2018/0341014 A1    Nov. 29, 2018

(51) Int. Cl.
| | |
|---|---|
| *G01S 13/88* | (2006.01) |
| *G01S 13/02* | (2006.01) |
| *G01S 13/10* | (2006.01) |
| *G01S 7/02* | (2006.01) |
| *G08G 5/00* | (2006.01) |

(Continued)

(52) U.S. Cl.
CPC ............ *G01S 13/882* (2013.01); *G01S 7/032* (2013.01); *G01S 13/0209* (2013.01); *G01S 13/10* (2013.01); *B64C 39/024* (2013.01); *B64C 2201/024* (2013.01); *B64C 2201/141* (2013.01); *G01S 13/881* (2013.01); *G01S 13/9303* (2013.01); *G01S 2007/027* (2013.01); *G08G 5/0069* (2013.01); *H01Q 1/28* (2013.01)

(58) Field of Classification Search
CPC ........ G01S 13/882; G01S 13/60; G01S 13/86; G01S 13/94; G01S 7/032; G01S 7/03; G01S 13/9303; G01S 2007/027; G01S 13/881; B64C 39/024; B64C 2201/027; B64C 2201/141; B64C 2201/20; B64C 2201/024; B64C 2201/00; B64C 1/061; G08G 5/0069; G08G 5/0013; H01Q 1/28
See application file for complete search history.

(56) References Cited

U.S. PATENT DOCUMENTS

| | | |
|---|---|---|
| 6,239,741 B1 | 5/2001 | Fontana et al. |
| 6,868,314 B1 | 3/2005 | Frink |
| 6,897,803 B2 | 5/2005 | Hager et al. |

(Continued)

FOREIGN PATENT DOCUMENTS

| | | |
|---|---|---|
| GB | 1368621 | 10/1974 |
| WO | WO2010085846 A2 | 8/2010 |

OTHER PUBLICATIONS

Hakki Nazli, Emrullah Bicak, Bahattin Turetken, and Mehmet Sezgin, "An Improved Design of Planar Dipole Antenna for UWB Applications", Mar. 29, 2010, IEEE Anetnnas and Wireless Propagation Letters, vol. 9, pp. 264-267 (Year: 2010).*

(Continued)

*Primary Examiner* — Olumide Ajibade Akonai
(74) *Attorney, Agent, or Firm* — Kinney & Lange, PA

(57) ABSTRACT

A system can include an unmanned aerial vehicle and an altimeter disposed on the unmanned aerial vehicle. The altimeter can include an ultra-wideband radar antenna disposed orthogonally to a plane of straight and level flight of the unmanned aerial vehicle and having an omnidirectional azimuthal beam pattern orthogonal to the plane of straight and level flight of the unmanned aerial vehicle. The altimeter can be configured to determine an altitude of the unmanned aerial vehicle above a target surface based on time of flight of radar pulses between the ultra-wideband radar antenna and the target surface.

19 Claims, 5 Drawing Sheets

(51) Int. Cl.
*H01Q 1/28* (2006.01)
*G01S 7/03* (2006.01)
*B64C 39/02* (2006.01)
*G01S 13/93* (2006.01)

(56) References Cited

U.S. PATENT DOCUMENTS

| | | | |
|---|---|---|---|
| 7,148,836 B2 | 12/2006 | Romero et al. | |
| 7,239,266 B2 | 7/2007 | Vacanti | |
| 7,830,989 B2 | 11/2010 | Mohamadi | |
| 8,044,842 B2* | 10/2011 | Thomas | G01S 13/882 342/120 |
| 8,098,193 B2 | 1/2012 | Sai et al. | |
| 8,259,002 B2 | 9/2012 | Vacanti et al. | |
| 9,110,168 B2 | 8/2015 | Mohamadi | |
| 9,335,405 B2 | 5/2016 | Durand et al. | |
| 9,643,718 B1* | 5/2017 | Beckman | B64C 27/463 |
| 2005/0275584 A1* | 12/2005 | Hager | G01S 13/882 342/120 |
| 2006/0058928 A1 | 3/2006 | Beard et al. | |
| 2007/0139261 A1* | 6/2007 | Vacanti | G01S 7/35 342/174 |
| 2008/0125920 A1* | 5/2008 | Miles | B64C 39/024 701/2 |
| 2009/0262008 A1 | 10/2009 | Thomas et al. | |
| 2010/0268458 A1* | 10/2010 | Becker | G01C 23/00 701/532 |
| 2016/0047657 A1* | 2/2016 | Caylor | G01C 21/005 701/521 |
| 2016/0376031 A1* | 12/2016 | Michalski | B64F 1/36 701/15 |
| 2017/0010350 A1 | 1/2017 | Winstead | |
| 2018/0027772 A1* | 2/2018 | Gordon | A01K 15/023 |

OTHER PUBLICATIONS

Extended European Search Report for European Patent Application No. 18157911.1, dated Jul. 25, 2018, 7 pages.

* cited by examiner

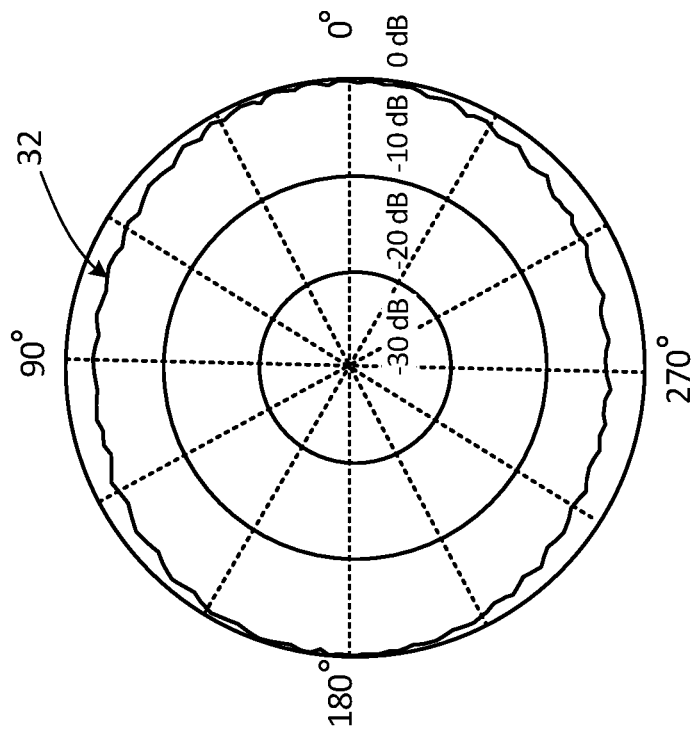
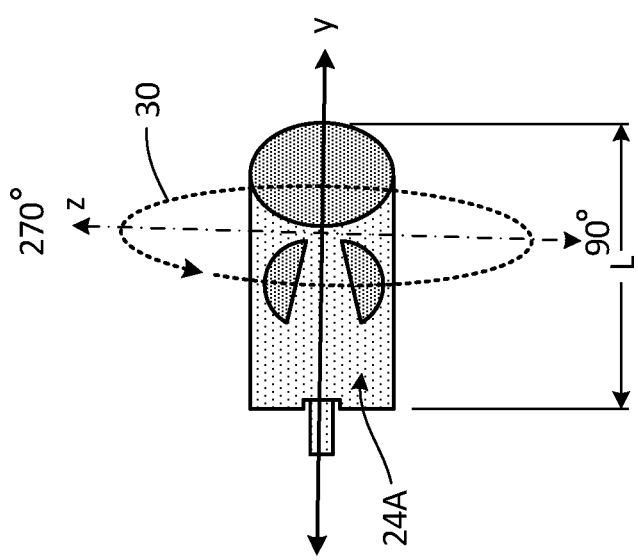
Fig. 2B
Fig. 2A

ULTRA-WIDEBAND RADAR ALTIMETER

BACKGROUND

This disclosure relates generally to ultra-wideband radar antennas, and more particularly to the use of ultra-wideband radar antennas by altimeters of unmanned aerial vehicles.

The proliferated use of unmanned aerial vehicles (UAVs) for a variety of mission operations has increased a need for accurate height sensing of UAVs (often referred to as drones) relative to surfaces over which the UAV may fly, hover, or land upon. Accurate height sensing is important for both navigation of the UAV as well as for logistical operations, such as the safe and effective delivery of goods to consumers and businesses. For instance, some vendors have begun using UAVs to deliver supplies to locations more efficiently than ground or waterway transport methods can offer. Moreover, the use of relatively small UAVs has enabled the delivery of supplies in a more individualized capacity to locations that may otherwise be inaccessible to traditional transport aircraft. Such UAVs, however, typically have limited size, weight, and electrical power capacity available for components of the UAV in an effort to limit the overall size of the UAV, as well as to increase its available cargo carrying capacity and operational range.

Accordingly, operational success of UAVs to accomplish a variety of missions, including the transport and delivery of supplies, can be enhanced through the use of an altimeter having low size and weight, as well as low electrical power demand requirements to provide accurate altitude information of the UAV above a target location and ensure damage-free arrival of the supplies to a recipient, whether the UAV is expected to land, drop the supplies from a predefined altitude, or lower the supplies from a hovering position with, e.g., a tethered harness.

SUMMARY

In one example, a system includes an unmanned aerial vehicle and an altimeter disposed on the unmanned aerial vehicle. The altimeter includes an ultra-wideband radar antenna disposed orthogonally to a plane of straight and level flight of the unmanned aerial vehicle and having an omnidirectional azimuthal beam pattern orthogonal to the plane of straight and level flight of the unmanned aerial vehicle. The altimeter is configured to determine an altitude of the unmanned aerial vehicle above a target surface based on time of flight of radar pulses between the ultra-wideband radar antenna and the target surface.

In another example, a method of determining an altitude of an unmanned aerial vehicle includes receiving radar pulses at an ultra-wideband radar antenna of an altimeter disposed on the unmanned aerial vehicle. The method further includes determining the altitude of the unmanned aerial vehicle based on time of flight of the radar pulses between the ultra-wideband radar antenna and a target surface. The ultra-wideband radar antenna is disposed orthogonally to a plane of straight and level flight of the unmanned aerial vehicle and has an omnidirectional azimuthal beam pattern orthogonal to the plane of straight and level flight of the unmanned aerial vehicle.

BRIEF DESCRIPTION OF THE DRAWINGS

FIG. 2A is a diagram illustrating an azimuthal span of the ultra-wideband radar antenna.

FIG. 2B is a graph in polar coordinates illustrating an example azimuthal beam pattern along the azimuthal span of the ultra-wideband radar antenna of FIG. 2A.

DETAILED DESCRIPTION

According to techniques of this disclosure, an altimeter for an unmanned aerial vehicle (UAV) utilizes an ultra-wideband radar antenna to determine an altitude of the UAV above a target surface (e.g., ground, landing pad, vehicle, building structure, or other target surface) based on time of flight of radar pulses between the ultra-wideband radar antenna and the target surface. The ultra-wideband radar antenna described herein has an omnidirectional azimuthal beam pattern, thereby providing consistency of beam intensity and sensitivity of the antenna throughout the entire azimuthal span. The ultra-wideband radar antenna is disposed on the UAV such that the omnidirectional beam pattern is orthogonal to a plane of straight and level flight of the UAV, thereby providing attitude-insensitive ranging between the ultra-wideband radar antenna and target surfaces below the UAV. Moreover, the omnidirectional azimuthal beam pattern enables placement of the ultra-wideband radar antenna on or within vertical surfaces of the UAV (e.g., surfaces that are orthogonal to the plane of straight and level flight, such as vertical surfaces of boom arms of a quadcopter UAV) that may otherwise be unavailable or undesirable for placement of radar-based altimeters. Additional capabilities of the ultra-wideband radar antenna to send and receive communications data via transmitted and received radar pulses can further enhance the ranging accuracy of the antenna as well as enable communication with, e.g., ground-based radar stations or other UAVs. As such, an altimeter implementing techniques of this disclosure can provide accurate (e.g., between 2-6 inches of accuracy), attitude-insensitive range information to a target surface as well as communication capabilities through the use of an ultra-wideband radar antenna having low size, weight, and electrical power requirements.

Figure 1:
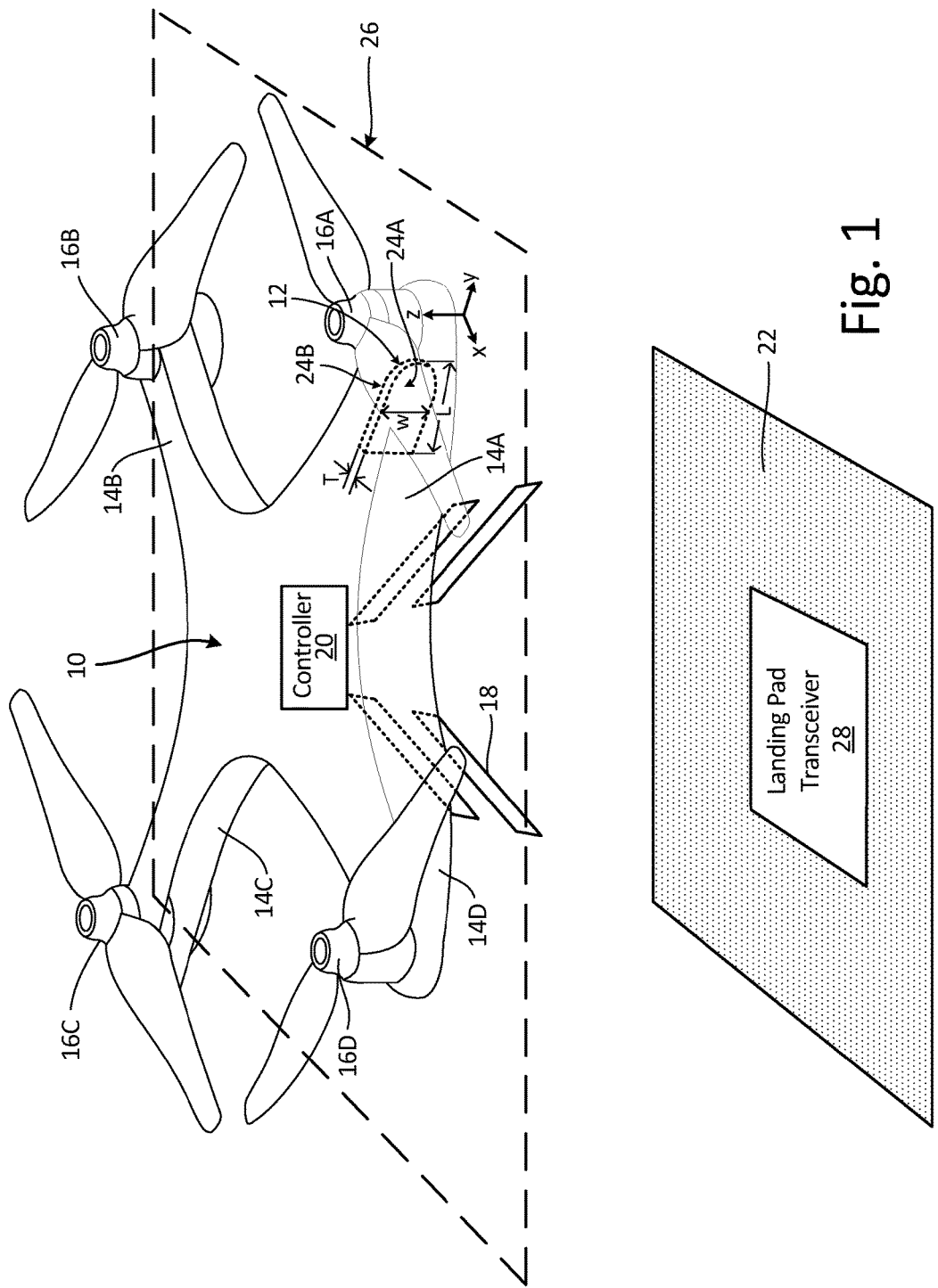
FIG. 1 is a schematic perspective view of an example unmanned aerial vehicle including an ultra-wideband radar antenna.

FIG. 1 is a schematic perspective view of unmanned aerial vehicle (UAV) 10 including ultra-wideband radar antenna 12. As illustrated in FIG. 1, UAV 10 further includes boom arms 14A, 14B, 14C, and 14D, rotors 16A, 16B, 16C, and 16D, landing struts 18, and controller 20.

Landing struts 18 extend from a central hub of UAV 10 to provide structural support for UAV 10 during landing operations. Boom arms 14A-14D extend from the central hub of UAV 10 and provide support for rotors 16A-16D that are controlled (e.g., individually controlled) to provide lift and coordinated flight of UAV 10. Each of rotors 16A-16D includes a motor (e.g., an electrical motor) that is operatively (e.g., communicatively and/or electrically) connected to controller 20 to provide rotational force for each of rotors 16A-16D during operation. Electrical and/or communicative connections between controller 20 and each of rotors 16A-16D can be wired connections that extend through an interior of boom arms 14A-14D or along an exterior of boom arms 14A-14D. In some examples, controller 20 can be wirelessly connected to, e.g., a separate motor controller or other controller device of each of rotors 16A-16D to provide wireless commands that are executed by the separate controller devices.

Controller 20, illustrated schematically within a central hub of UAV 10, includes one or more processors and computer-readable memory configured to control operation of UAV 10 during flight. For instance, controller 20 can implement autopilot or other navigational control algorithms to automatically control operation of each of rotors 16A-16B to cause UAV 10 to follow a defined flight path and/or to navigate between specified geographical locations. Controller 20, in some examples, can include one or more positional and/or navigational sensors, such as an inertial measurement unit (IMU) having a plurality of accelerometers and/or rate gyroscopes configured to sense relative motion of UAV 10 during flight, one or more global positioning system (GPS) receivers configured to provide geolocation and time information to UAV 10, or other positional and/or navigational sensors. In other examples, positional and/or navigational sensors can be disposed within UAV 10 remote from controller 20 and operatively coupled with controller 20 to provide sensed parameters to controller 20 for controlled operation of UAV 10.

Controller 20, in some examples, can be further connected (e.g., electrically and/or communicatively connected) to control operation of grasping appendages or other engagement mechanisms (not illustrated) to engage (e.g., grasp) and disengage packages, supplies, or other objects that can be delivered from one location to another. Engagement mechanisms can additionally or alternatively include, in certain examples, a tethered cord and clasp that can be selectively controlled to raise and lower objects to and from a target location, such as landing pad 22. In other examples, UAV 10 may not include any engagement mechanisms.

Ultra-wideband radar antenna 12, as illustrated in FIG. 1, is disposed within an interior of boom arm 14A, though in other examples, ultra-wideband radar antenna 12 can be disposed at other locations of UAV 10, such as any of boom arms 14B-14D, landing struts 18, or other locations of UAV 10. In some examples, ultra-wideband radar antenna 12 can be mounted to an exterior of UAV 10, such as directly to an exterior surface of UAV 10 or within a housing that is mounted to the exterior surface.

Ultra-wideband radar antenna 12 can be a planar elliptical dipole antenna or other ultra-wideband radar antenna configured to transmit and/or receive ultra-wideband radio frequencies (i.e., radio frequencies for which emitted signal bandwidth exceeds the lesser of 500 MHz or 20% of the arithmetic center frequency). For instance, ultra-wideband radar antenna 12 can be configured to emit and/or receive radio frequencies centered at the 4.3 GHz frequency band and having a signal bandwidth of 2 GHz. Though illustrated in FIG. 1 as including a single ultra-wideband radar antenna 12, in other examples, UAV 10 can include multiple ultra-wideband radar antennas, as is further described below. For instance, UAV 10 can include multiple ultra-wideband radar antennas (e.g., two, three, four, or more ultra-wideband radar antennas) disposed at separate locations of UAV 10, each configured to both transmit and receive ultra-wideband radio frequency signals. In some examples, UAV 10 can include multiple ultra-wideband radar antennas, each configured to either transmit or receive ultra-wideband radio frequency signals.

Ultra-wideband radar antenna 12 is operatively connected with a controller device, such as controller 20 or another controller device having one or more processors configured to generate signals to be emitted by ultra-wideband radar antenna 12 and condition signals received by ultra-wideband radar antenna 12, to form an altimeter than can determine an altitude of ultra-wideband radar antenna 12 (and hence UAV 10) above a target surface or other object. That is, ultra-wideband radar antenna 12, in combination with a controller device, forms an altimeter than can determine an altitude of UAV 10 above a surface (e.g., landing pad 22, the ground, a vehicle, a building structure, canopies, or other surface or object) based on a time of flight of radar pulses between ultra-wideband radar antenna 12 and the surface, as is further described below. In addition, ultra-wideband radar antenna 12 can be utilized by the altimeter to determine a range from any target surface that may be below, above, or at a same altitude as UAV 10, such as bridges or other structures that UAV 10 may pass under during flight. Accordingly, while described herein as an altimeter that can determine an altitude of UAV 10 above a target surface, it should be understood that an altimeter implementing techniques of this disclosure can utilize ultra-wideband radar antenna 12 to determine a range of UAV 10 from any target surface that may be below, above, or otherwise relatively oriented with respect to UAV 10.

Ultra-wideband radar antenna 12 can be disposed on a rigid or flexible circuit board substrate. For instance, in some examples, ultra-wideband radar antenna 12 is disposed on a flexible circuit board substrate and is mounted to a non-linear contoured surface of UAV 10, thereby increasing a versatility of possible mounting positions of ultra-wideband radar antenna 12 to an exterior surface of UAV 10 or within an interior of UAV 10.

In the example of FIG. 1, ultra-wideband radar antenna 12 has first major face 24A and second major face 24B opposite first major face 24A. Each of first major face 24A and second major face 24B has width W extending in a direction along axis Z, length L extending in a direction along axis Y, and thickness T extending between first major face 24A and second major face 24B in a direction along axis X. Each of axes X, Y, and Z are mutually-orthogonal. Though illustrated in FIG. 1 as having a length L that is greater than width W, in some examples, each of first major face 24A and second major face 24B can have other relative dimensions and/or shapes. For instance, in some examples, each of first major face 24A and second major face 24B can have a width W that is greater than length L. In certain examples, each of first major face 24A and 24B can have a circular or other shape. In some examples, thickness T of ultra-wideband radar antenna 12 is less than 0.1 inches, and a surface area of each of first major face 24A and second major face 24B is less than 6 square inches.

Plane 26 illustrated in FIG. 1 represents a plane of straight and level flight of UAV 10 corresponding to 0 degrees pitch and 0 degrees roll of UAV 10. That is, while an attitude (i.e., pitch and roll) of UAV 10 can deviate from plane 26 during flight, plane 26 bisects a corresponding portion of each of boom arms 14A-14D (or, equivalently, a corresponding portion of each of rotors 16A-16D) during operation of UAV 10 at 0 degrees pitch and 0 degrees roll (i.e., straight and level flight).

As illustrated in FIG. 1, ultra-wideband radar antenna 12 is disposed on (or within) UAV 10 such that width W extending along axis Z is orthogonal to plane 26 and length L extending along axis Y is parallel to plane 26 during operation of UAV 10 at an attitude corresponding to straight and level flight of UAV 10 (i.e., 0 degrees pitch and 0 degrees roll attitude of UAV 10). Ultra-wideband radar antenna 12 has an omnidirectional beam pattern that circumscribes first major face 24A and second major face 24B about length L extending along axis Y, thereby enabling attitude-insensitive altitude measurements between ultra-wideband radar antenna 12 and a target surface, as is further described below.

UAV 10 can further utilize ultra-wideband radar antenna 12 for communication with other ultra-wideband radar antennas via, e.g., pulse position or other time modulation communication operations. For instance, controller 20 (or another controller device operatively coupled with ultra-wideband radar antenna 12) can transmit and receive time-modulated radio frequency signals with ultra-wideband radar antennas of one or more remote UAVs, such as to communicate position information, route information, or other information between UAV 10 and the one or more UAVs that are remote from UAV 10.

In some examples, such as the example of FIG. 1, UAV 10 can utilize ultra-wideband radar antenna 12 to communicate with a ground-based antenna, such as landing pad transceiver 28. For instance, landing pad transceiver 28 can be positioned at landing pad 22 to communicate via transmitted and received ultra-wideband radar communications. UAV 10, utilizing ultra-wideband radar antenna 12, can send and receive data communications with landing pad transceiver 28 via ultra-wideband radar communications. In some examples, data communications between ultra-wideband radar antenna 12 and landing pad transceiver 28 can include data corresponding to a predefined geolocation of landing pad 22 for use as reference geolocation data in feedback to an IMU or other navigational control system of UAV 10. In certain examples, data communications between ultra-wideband radar antenna 12 and landing pad transceiver 28 can include data corresponding to modified route or flight plan commands for UAV 10, thereby facilitating remote direction of UAV 10 to navigate between geographical locations, such as for delivery of supplies between the locations. In some examples, UAV 10 can determine an altitude above a target surface (e.g., landing pad 22) based on a time of flight of radar pulses emitted by landing pad transceiver 28 and received by ultra-wideband radar antenna 12. For instance, landing pad transceiver 28 can transmit radar pulses encoded with time information corresponding to a time of transmission of the pulses. An altitude of UAV 10 can be determined based on a time of flight of the radar pulse determined from an elapsed time between transmission of the radar pulse and reception of the pulse by ultra-wideband radar antenna 12.

In operation, UAV 10 utilizes grasping appendages 18A and 18B (or other supply engagement mechanisms) to transport supplies between geographical locations. Geographical locations can include cooperative, prescribed logistic zones or unprepared non-cooperative zones. Delivery of supplies can include, e.g., a soft landing of UAV 10 to disengage from and deliver the supplies (e.g., at the target surface), a controlled drop of the supplies from a predefined altitude above the target surface, or a tethered descent of the supplies to the target surface.

UAV 10 utilizes ultra-wideband radar antenna 12 to determine an altitude of UAV 10 above surfaces over which UAV 10 travels based on a time of flight of radar pulses between ultra-wideband radar antenna 12 and the target surfaces. Such surfaces can be at ground level, elevated from ground level, or recessed below ground level. The surfaces can be, e.g., rooftops, canopies, ground vehicle platforms, or surfaces comprised of manmade materials (e.g., asphalt, concrete, plastics, fabrics, composites, processed metals, or other manmade materials) or natural materials (e.g., processed or unprocessed wood, soil, sand, rock, grass, or other natural material).

In some examples, the altimeter of UAV 10 (i.e., ultra-wideband radar antenna 12 in combination with a controller device) transitions from an inactive operational mode to an active operational mode in response to an activation command initiated by, e.g., controller 20. For example, the altimeter can refrain from causing ultra-wideband radar antenna 12 to transmit radar pulses and can refrain from processing radar signals received by ultra-wideband radar antenna 12 during operation in the inactive operational mode, thereby decreasing an electrical power consumption of the altimeter. The altimeter can cause ultra-wideband radar antenna 12 to transmit radar pulses and can process radar signals received by ultra-wideband radar antenna 12 during operation in the active operational mode. In some examples, controller 20 initiates the activation command to cause the altimeter to transition from the inactive operational mode to the active operational mode based on geographical position data sensed by positional and/or navigational sensors, such as GPS transceivers of UAV 10. For instance, controller 20 can initiate the activation command in response to determining that latitude and longitude coordinates of UAV 10 sensed by the GPS transceivers satisfy target position criteria, such as latitude and longitude coordinates of a target location such as landing pad 22 or other target location. UAV 10 can therefore utilize target position criteria to activate the altimeter including ultra-wideband radar antenna 12 for altitude determinations when UAV 10 is near to a target location, thereby decreasing power consumption of the altimeter from, e.g., a battery of UAV 10 and helping to increase an overall operational range of UAV 10.

As such, an altimeter of UAV 10 utilizing ultra-wideband radar antenna 12 can determine an altitude of UAV 10 above a target surface based on time of flight of radar pulses between ultra-wideband radar antenna 12 and the target surface. An omnidirectional azimuthal beam pattern of ultra-wideband radar antenna 12 enables attitude-insensitive altitude determinations and mounting of ultra-wideband radar antenna 12 on or within vertical surfaces of UAV 10 (i.e., surfaces that are orthogonal to a plane of straight and level flight of UAV 10) that may otherwise be unavailable or undesirable for placement of antennas having a beam pattern than is not omnidirectional about an azimuthal span. Accordingly, an altimeter implementing techniques of this disclosure can provide accurate, attitude-insensitive range information to a target surface as well as communication capabilities through the use of an ultra-wideband radar antenna having low size, weight, and electrical power requirements.

FIG. 2A is a diagram illustrating azimuthal span 30 of ultra-wideband radar antenna 12 of FIG. 1. FIG. 2B is a graph in polar coordinates illustrating azimuthal beam pattern 32 of ultra-wideband radar antenna 12 along azimuthal span 30 of FIG. 2A.

As illustrated in FIG. 2A, azimuthal span 30 ranges from an angle equal to 0 degrees to an angle equal to 360 degrees about axis Y. Azimuthal span 30 therefore circumscribes first major face 24A and second major face 24B (not shown in FIG. 2A) perpendicularly to length L that extends along axis Y. FIG. 2B illustrates azimuthal beam pattern 32 corresponding to a magnitude of beam intensity and sensitivity of ultra-wideband radar antenna 12 along azimuthal span 30 ranging from 0 degrees to 360 degrees on a scale ranging from 0 decibels (dB) of attenuation to −30 dB of attenuation. As illustrated in FIG. 2B, azimuthal beam pattern 32 has an omnidirectional beam pattern about azimuthal span 30 having attenuation that is less than approximately 5 dB through an entirety of azimuthal span 30. In general, the omnidirectional beam pattern of ultra-wideband radar antenna 12 can have attenuation that is not greater than 10 dB throughout the entirety of azimuthal span 30, thereby providing consistency of beam intensity and sensitivity of ultra-wideband radar antenna 12 throughout the entirety of azimuthal span 30.

Figure 3A:
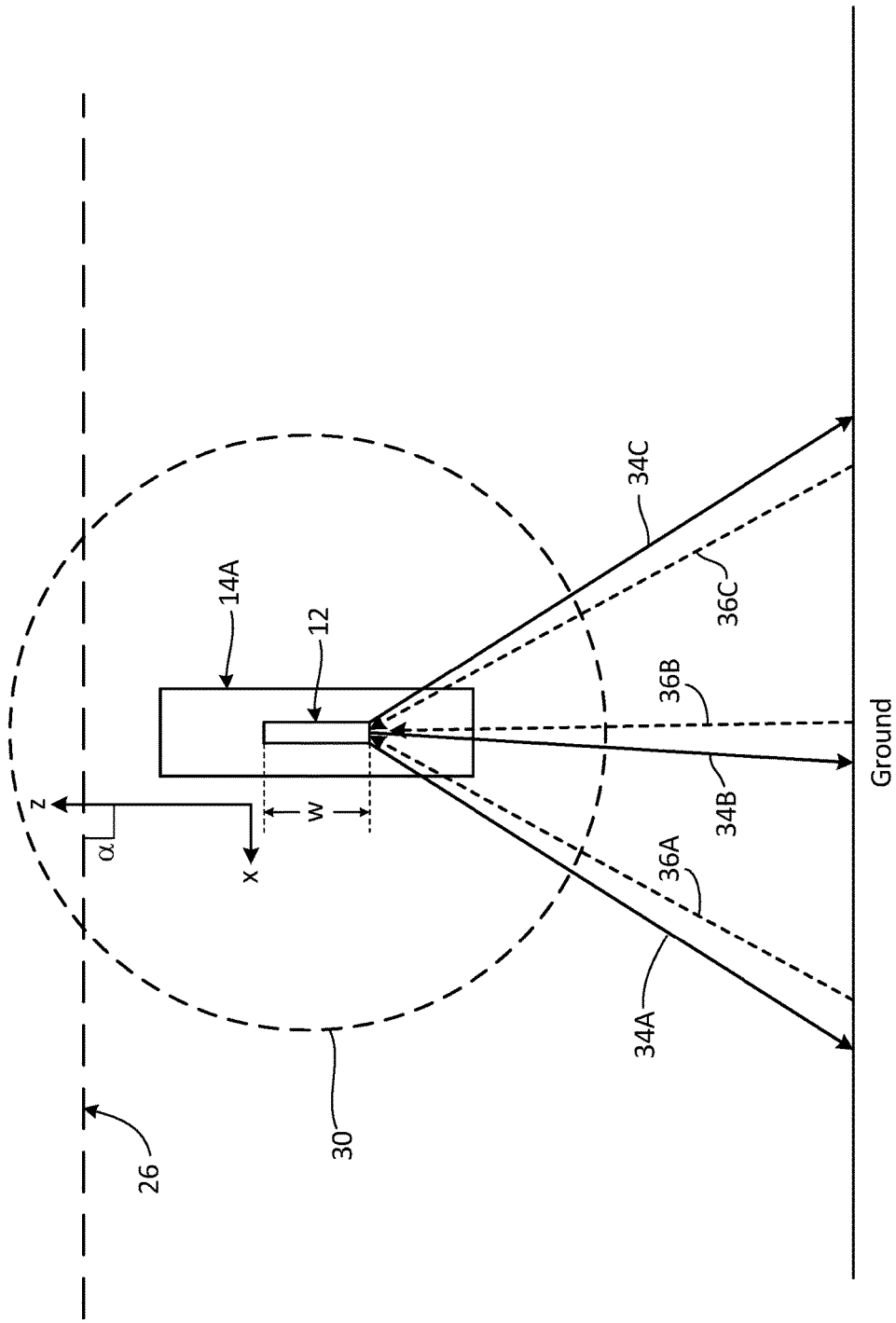
FIG. 3A is a schematic cross-sectional view of a boom arm of the unmanned aerial vehicle of FIG. 1 illustrating the ultra-wideband radar antenna oriented at a first angle with respect to a plane of straight and level flight of the unmanned aerial vehicle.

FIG. 3A is a schematic cross-sectional view of boom arm 14A of UAV 10 of FIG. 1 illustrating ultra-wideband radar antenna 12 having width W extending in a direction along axis Z at angle α with respect to plane 26 (i.e., corresponding to a plane of straight and level flight of UAV 10). In the example of FIG. 3A, angle α is 90 degrees, indicating that UAV 10 is in straight and level flight. Due to the omnidirectional beam pattern of ultra-wideband radar antenna 12, radar pulses transmitted by ultra-wideband radar antenna 12 are emitted with substantially similar intensity about an entirety of azimuthal span 30. Similarly, ultra-wideband radar antenna 12 has substantially similar sensitivity to received radar pulse returns (i.e., reflected returns off the ground in this example) about an entirety of azimuthal span 30. As such, while the example of FIG. 3A illustrates emitted radar pulses along directional vectors 34A, 34B, and 34C and reflected radar pulse returns along directional vectors 36A, 36B, and 36C for purposes of clarity and ease of discussion, it should be understood that radar pulses are emitted from and received by ultra-wideband radar antenna 12 in a continuous omnidirectional field about the entirety of azimuthal span 30.

In operation, ultra-wideband radar antenna 12 emits a radar pulse at a first time and receives radar pulse returns at varying subsequent times after reflection of the emitted radar pulse. The altimeter of UAV 10 selects a shortest round-trip time of flight of the emitted radar pulse (i.e., a time duration between the first time corresponding to transmission of the radar pulse and a time of the received radar pulse) and determines the altitude of ultra-wideband radar antenna 12 as the line of sight path length of the radar pulse based on the shortest round-trip time of flight. In the example of FIG. 3, a time of flight corresponding to a received radar return along directional vector 36B is selected and a corresponding altitude is determined.

Figure 3B:
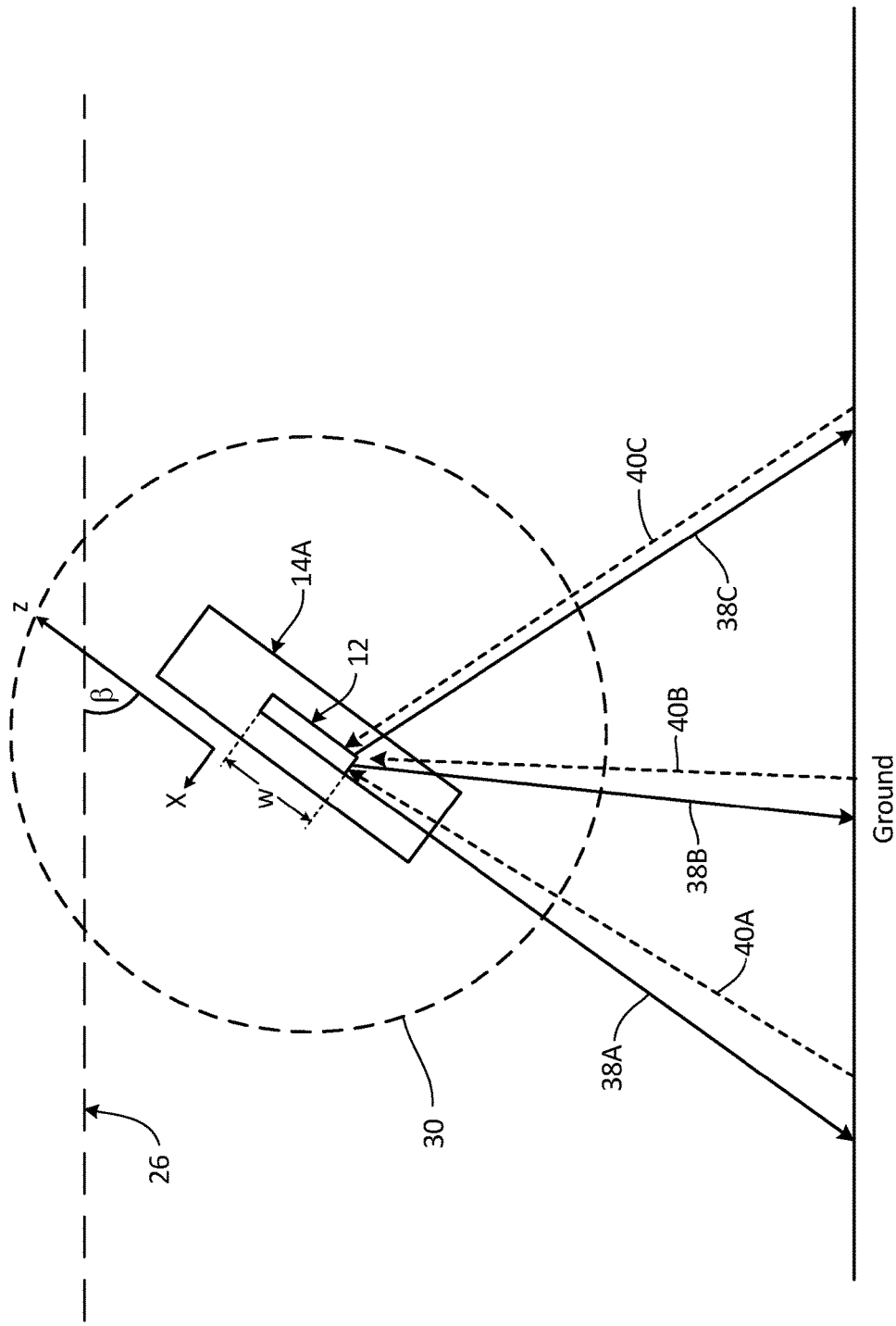
FIG. 3B is a schematic cross-sectional view of the boom arm and ultra-wideband radar antenna of FIG. 3A oriented at a second angle with respect to the plane of straight and level flight of the unmanned aerial vehicle.

FIG. 3B is a schematic cross-sectional view of boom arm 14A of FIG. 3A illustrating ultra-wideband radar antenna 12 having width W extending in a direction along axis Z at angle β with respect to plane 26. That is, in the example of FIG. 3B, boom arm 14A (and hence ultra-wideband radar antenna 12 disposed within boom arm 14A) is oriented such that axis Z intersects plane 26 corresponding to the plane of straight and level flight of UAV 10 at angle β (i.e., less than 90 degrees), such as when an attitude (i.e., pitch and/or roll) of UAV 10 deviates from straight and level flight. As was similarly described above with respect to the example of FIG. 3A, ultra-wideband radar antenna 12 emits radar pulses with substantially similar intensity about an entirety of azimuthal span 30 and has substantially similar sensitivity to received radar pulse returns about the entirety of azimuthal span 30 due to the omnidirectional beam pattern of ultra-wideband radar antenna 12. As such, radar pulses transmitted from ultra-wideband radar antenna 12 are emitted from and received by ultra-wideband radar antenna 12 in a continuous omnidirectional field about the entirety of azimuthal span 30, thereby enabling the altimeter of UAV 10 to determine the altitude of ultra-wideband radar antenna 12 as the line of sight path length of the received radar pulse return having the shortest round-trip time of flight (the received radar return along directional vector 40B in this example) regardless of the change in attitude of ultra-wideband radar antenna 12.

Figure 4:
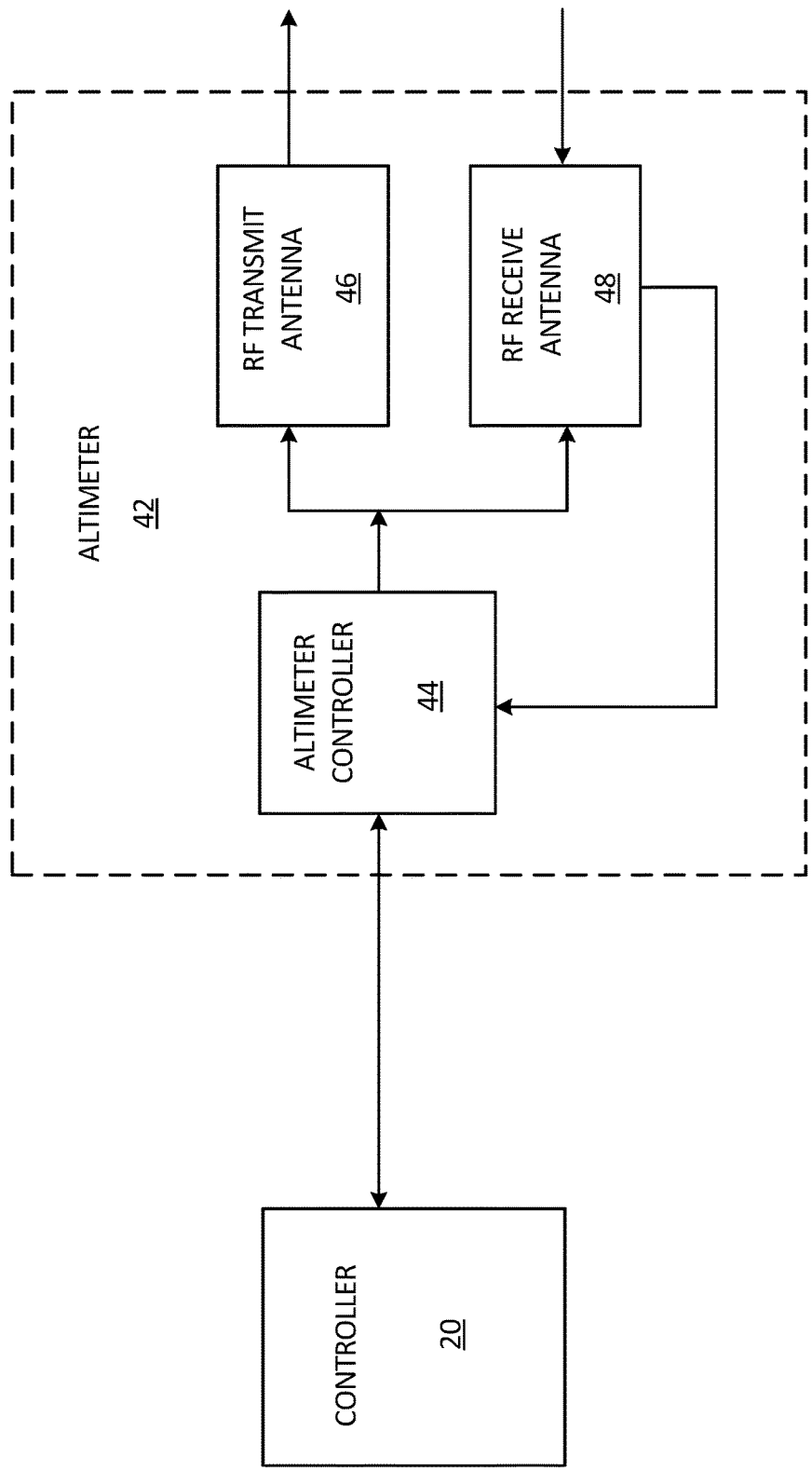
FIG. 4 is a block diagram illustrating an altimeter including a controller device, an ultra-wideband radar transmit antenna, and an ultra-wideband radar receive antenna.

FIG. 4 is a block diagram illustrating altimeter 42 including altimeter controller 44, ultra-wideband radar transmit antenna 46, and ultra-wideband radar receive antenna 48. As illustrated in FIG. 4, altimeter controller 44 is operatively connected (e.g., electrically and/or communicatively connected) to controller 20 of UAV 10 (FIG. 1). In the example of FIG. 4, rather than a single ultra-wideband radar antenna, altimeter 42 includes ultra-wideband radar transmit antenna 46 and ultra-wideband radar receive antenna 48. Each of ultra-wideband radar transmit antenna 46 and ultra-wideband radar receive antenna 48 can be substantially similar to ultra-wideband radar antenna 12 (FIG. 1), though in the example of FIG. 4, altimeter controller 44 utilizes ultra-wideband radar transmit antenna 46 to transmit radar pulses and processes radar pulse returns received by ultra-wideband radar receive antenna 48. However, in other examples, altimeter 42 can utilize a single ultra-wideband radar antenna, such as ultra-wideband radar antenna 12 (FIG. 1) to both transmit and receive the ultra-wideband radar signals.

Each of altimeter controller 44 and controller 20 can include one or more processors and computer-readable memory encoded with instructions that, when executed by the one or more processors, cause altimeter controller 44 and controller 20 to operate in accordance with techniques described herein. Examples of the one or more processors include any one or more of a microprocessor, a digital signal processor (DSP), an application specific integrated circuit (ASIC), a field-programmable gate array (FPGA), or other equivalent discrete or integrated logic circuitry. Computer-readable memory of altimeter controller 44 and controller 20 can be configured to store information within altimeter controller 44 and controller 20 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of altimeter controller 44 and controller 20 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories.

In operation, altimeter controller 44 generates transmit signals that are emitted by ultra-wideband radar transmit antenna 46 in the form of ultra-wideband radio frequency pulses. Ultra-wideband radar receive antenna 48 receives ultra-wideband radio frequency pulses, such as radar pulse returns after reflection from a target surface and/or radar pulses received from external antennas (e.g., landing pad transceiver 28 of FIG. 1). Altimeter controller 44 processes the received radar pulses to determine an altitude of UAV 10 based on a determined time of flight of the received radar pulses and/or to process communication data received from one or more external transceivers. Altimeter controller 44 transmits the altitude and/or communication data to controller 20, which utilizes the received data for controlled flight of UAV 10 and for delivery of supplies to one or more target locations.

Accordingly, altimeter 42 implementing techniques of this disclosure utilizes one or more ultra-wideband radar antennas having omnidirectional azimuthal beam patterns to determine an altitude of UAV 10 above a target surface based on time of flight of radar pulses between the ultra-wideband radar antenna and the target surface. The omnidirectional azimuthal beam pattern enables mounting of the ultra-wideband radar antenna on or within vertical surfaces of UAV 10 (i.e., surfaces that are orthogonal to a plane of straight and level flight of UAV 10) that may otherwise be unavailable or undesirable for placement of antennas having a beam pattern than is not omnidirectional about the azimuthal span. Accordingly, an altimeter implementing techniques of this disclosure can provide accurate, attitude-insensitive range information to a target surface as well as communication capabilities through the use of an ultra-wideband radar antenna having low size, weight, and electrical power requirements.

Discussion of Possible Embodiments

The following are non-exclusive descriptions of possible embodiments of the present invention.

A system includes an unmanned aerial vehicle and an altimeter disposed on the unmanned aerial vehicle. The altimeter includes an ultra-wideband radar antenna disposed orthogonally to a plane of straight and level flight of the unmanned aerial vehicle and having an omnidirectional azimuthal beam pattern orthogonal to the plane of straight and level flight of the unmanned aerial vehicle. The altimeter is configured to determine an altitude of the unmanned aerial vehicle above a target surface based on time of flight of radar pulses between the ultra-wideband radar antenna and the target surface.

The system of the preceding paragraph can optionally include, additionally and/or alternatively, any one or more of the following features, configurations and/or additional components:

The ultra-wideband radar antenna can be a planar elliptical dipole antenna.

A magnitude of attenuation of the omnidirectional azimuthal beam pattern of the ultra-wideband radar antenna can be not greater than 10 decibels through an entire azimuthal span of the ultra-wideband radar antenna.

The altimeter can be configured to determine the altitude of the unmanned aerial vehicle above the target surface based on time of flight of radar pulses between the ultra-wideband radar antenna and the target surface by selecting a shortest round-trip time of flight of radar pulses emitted from the ultra-wideband radar antenna and received by the ultra-wideband radar antenna after reflection off the target surface.

The altimeter can be configured to determine the altitude of the unmanned aerial vehicle above the target surface based on time of flight of radar pulses between the ultra-wideband radar antenna and the target surface by selecting a shortest time of flight of radar pulses emitted from a remote ultra-wideband radar antenna disposed at the target surface.

The altimeter can be configured to receive communication data from the remote ultra-wideband radar antenna disposed at the target surface.

The ultra-wideband radar antenna can include a first ultra-wideband radar antenna configured to transmit radar pulses. The altimeter can further include a second ultra-wideband radar antenna configured to receive radar pulses.

The ultra-wideband radar antenna can be disposed on a flexible circuit board substrate that is mounted to a non-linear contoured surface of the unmanned aerial vehicle.

The ultra-wideband radar antenna can be disposed internally to the unmanned aerial vehicle.

The ultra-wideband radar antenna can be disposed on an external surface of the unmanned aerial vehicle.

The altimeter can be configured to transition from an inactive operational mode to an active operational mode in response to an activation command from a controller device of the unmanned aerial vehicle. The altimeter can refrain from causing the ultra-wideband radar antenna to transmit radar pulses during the inactive operational mode. The altimeter can cause the ultra-wideband radar antenna to transmit the radar pulses during the active operational mode.

The unmanned aerial vehicle can initiate the activation command based on geographical position data of the unmanned aerial vehicle.

The ultra-wideband radar antenna can include: a first major face having a width extending along a first axis and a length extending along a second axis that is perpendicular to the first axis; a second major face opposite the first major face, the second major face having the width extending along the first axis and the length extending along the second axis; and a thickness extending between the first major face and the second major face along a third axis that is orthogonal to both the first axis and the second axis. The second axis can be parallel to the plane of straight and level flight of the unmanned aerial vehicle. The omnidirectional azimuthal beam pattern can circumscribe the first major face and the second major face about the second axis.

The thickness can be less than 0.1 inches. A surface area of each of the first major face and the second major face can be less than 6 square inches.

A method a method of determining an altitude of an unmanned aerial vehicle includes receiving radar pulses at an ultra-wideband radar antenna of an altimeter disposed on the unmanned aerial vehicle. The method further includes determining the altitude of the unmanned aerial vehicle based on time of flight of the radar pulses between the ultra-wideband radar antenna and a target surface. The ultra-wideband radar antenna is disposed orthogonally to a plane of straight and level flight of the unmanned aerial vehicle and has an omnidirectional azimuthal beam pattern orthogonal to the plane of straight and level flight of the unmanned aerial vehicle.

The method of the preceding paragraph can optionally include, additionally and/or alternatively, any one or more of the following features, configurations, operations, and/or additional components:

The method can further include transmitting the radar pulses from the ultra-wideband radar antenna. Receiving the radar pulses at the ultra-wideband radar antenna can include receiving the radar pulses after reflection off the target surface. Determining the altitude of the unmanned aerial vehicle based on time of flight of the radar pulses between the ultra-wideband radar antenna and the target surface can include selecting a shortest round-trip time of flight of the received radar pulses.

The ultra-wideband radar antenna can include a first ultra-wideband radar antenna. The altimeter can include a second ultra-wideband radar antenna. Transmitting the radar pulses from the ultra-wideband radar antenna can include transmitting the radar pulses from the first ultra-wideband radar antenna. Receiving the radar pulses at the ultra-wideband radar antenna after reflection off the target surface can include receiving the radar pulses by the second ultra-wideband radar antenna.

Receiving the radar pulses at the ultra-wideband radar antenna can include receiving the radar pulses transmitted from a remote ultra-wideband radar antenna disposed at the target surface. Determining the altitude of the unmanned aerial vehicle based on time of flight of the radar pulses between the ultra-wideband radar antenna and the target surface can include selecting a shortest time of flight of the received radar pulses transmitted from the remote ultra-wideband radar antenna.

The method can further include: operating the altimeter in an inactive operational mode by refraining from causing the ultra-wideband radar antenna to transmit the radar pulses; receiving an activation command from a controller device of the unmanned aerial vehicle; and operating the altimeter in an active operational mode by causing the ultra-wideband radar antenna to transmit the radar pulses in response to receiving the activation command.

The method can further include initiating, by the controller device of the unmanned aerial vehicle, the activation command in response to determining that geographical position data of the unmanned aerial vehicle satisfies target position criteria.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
an unmanned aerial vehicle; and
an altimeter disposed on the unmanned aerial vehicle, the altimeter including an ultra-wideband radar antenna disposed orthogonally to a plane of straight and level flight of the unmanned aerial vehicle and having an omnidirectional azimuthal beam pattern orthogonal to the plane of straight and level flight of the unmanned aerial vehicle, the altimeter configured to determine an altitude of the unmanned aerial vehicle above a target surface based on time of flight of radar pulses between the ultra-wideband radar antenna and the target surface;
wherein the ultra-wideband radar antenna includes:
a first major face having a width extending along a first axis and a length extending along a second axis that is perpendicular to the first axis;
a second major face opposite the first major face, the second major face having the width extending along the first axis and the length extending along the second axis; and
a thickness extending between the first major face and the second major face along a third axis that is orthogonal to both the first axis and the second axis;
wherein the second axis is parallel to the plane of straight and level flight of the unmanned aerial vehicle; and
wherein the omnidirectional azimuthal beam pattern circumscribes the first major face and the second major face about the second axis.

2. The system of claim 1,
wherein the ultra-wideband radar antenna is a planar elliptical dipole antenna.

3. The system of claim 1,
wherein a magnitude of attenuation of the omnidirectional azimuthal beam pattern of the ultra-wideband radar antenna is not greater than 10 decibels through an entire azimuthal span of the ultra-wideband radar antenna.

4. The system of claim 1,
wherein the altimeter is configured to determine the altitude of the unmanned aerial vehicle above the target surface based on time of flight of radar pulses between the ultra-wideband radar antenna and the target surface by selecting a shortest round-trip time of flight of radar pulses emitted from the ultra-wideband radar antenna and received by the ultra-wideband radar antenna after reflection off the target surface.

5. The system of claim 1,
wherein the altimeter is configured to determine the altitude of the unmanned aerial vehicle above the target surface based on time of flight of radar pulses between the ultra-wideband radar antenna and the target surface by selecting a shortest time of flight of radar pulses emitted from a remote ultra-wideband radar antenna disposed at the target surface.

6. The system of claim 5,
wherein the altimeter is configured to receive communication data from the remote ultra-wideband radar antenna disposed at the target surface.

7. The system of claim 1,
wherein the ultra-wideband radar antenna comprises a first ultra-wideband radar antenna configured to transmit radar pulses; and
wherein the altimeter further includes a second ultra-wideband radar antenna configured to receive radar pulses.

8. The system of claim 1,
wherein the ultra-wideband radar antenna is disposed on a flexible circuit board substrate that is mounted to a non-linear contoured surface of the unmanned aerial vehicle.

9. The system of claim 1,
wherein the ultra-wideband radar antenna is disposed internally to the unmanned aerial vehicle.

10. The system of claim 1,
wherein the ultra-wideband radar antenna is disposed on an external surface of the unmanned aerial vehicle.

11. The system of claim 1,
wherein the altimeter is configured to transition from an inactive operational mode to an active operational mode in response to an activation command from a controller device of the unmanned aerial vehicle;
wherein the altimeter refrains from causing the ultra-wideband radar antenna to transmit radar pulses during the inactive operational mode; and
wherein the altimeter causes the ultra-wideband radar antenna to transmit the radar pulses during the active operational mode.

12. The system of claim 11,
wherein the unmanned aerial vehicle initiates the activation command based on geographical position data of the unmanned aerial vehicle.

13. The system of claim 1,
wherein the thickness is less than 0.1 inches; and
wherein a surface area of each of the first major face and the second major face is less than 6 square inches.

14. A method of determining an altitude of an unmanned aerial vehicle, the method comprising:
receiving radar pulses at an ultra-wideband radar antenna of an altimeter disposed on the unmanned aerial vehicle; and
determining the altitude of the unmanned aerial vehicle based on time of flight of the radar pulses between the ultra-wideband radar antenna and a target surface;
wherein the ultra-wideband radar antenna is disposed orthogonally to a plane of straight and level flight of the unmanned aerial vehicle and has an omnidirectional azimuthal beam pattern orthogonal to the plane of straight and level flight of the unmanned aerial vehicle;
wherein the ultra-wideband radar antenna includes:
a first major face having a width extending along a first axis and a length extending along a second axis that is perpendicular to the first axis;
a second major face opposite the first major face, the second major face having the width extending along the first axis and the length extending along the second axis; and
a thickness extending between the first major face and the second major face along a third axis that is orthogonal to both the first axis and the second axis;
wherein the second axis is parallel to the plane of straight and level flight of the unmanned aerial vehicle; and
wherein the omnidirectional azimuthal beam pattern circumscribes the first major face and the second major face about the second axis.

15. The method of claim 14, further comprising:
transmitting the radar pulses from the ultra-wideband radar antenna;
wherein receiving the radar pulses at the ultra-wideband radar antenna comprises receiving the radar pulses after reflection off the target surface; and
wherein determining the altitude of the unmanned aerial vehicle based on time of flight of the radar pulses between the ultra-wideband radar antenna and the target surface comprises selecting a shortest round-trip time of flight of the received radar pulses.

16. The method of claim 15,
wherein the ultra-wideband radar antenna comprises a first ultra-wideband radar antenna;
wherein the altimeter comprises a second ultra-wideband radar antenna;
wherein transmitting the radar pulses from the ultra-wideband radar antenna comprises transmitting the radar pulses from the first ultra-wideband radar antenna; and
wherein receiving the radar pulses at the ultra-wideband radar antenna after reflection off the target surface comprises receiving the radar pulses by the second ultra-wideband radar antenna.

17. The method of claim 14,
wherein receiving the radar pulses at the ultra-wideband radar antenna comprises receiving the radar pulses transmitted from a remote ultra-wideband radar antenna disposed at the target surface; and
wherein determining the altitude of the unmanned aerial vehicle based on time of flight of the radar pulses between the ultra-wideband radar antenna and the target surface comprises selecting a shortest time of flight of the received radar pulses transmitted from the remote ultra-wideband radar antenna.

18. The method of claim 14, further comprising:
operating the altimeter in an inactive operational mode by refraining from causing the ultra-wideband radar antenna to transmit the radar pulses;
receiving an activation command from a controller device of the unmanned aerial vehicle; and
operating the altimeter in an active operational mode by causing the ultra-wideband radar antenna to transmit the radar pulses in response to receiving the activation command.

19. The method of claim 18, further comprising:
initiating, by the controller device of the unmanned aerial vehicle, the activation command in response to determining that geographical position data of the unmanned aerial vehicle satisfies target position criteria.

* * * * *